United States Patent [19]
Koch et al.

[11] 4,320,860
[45] Mar. 23, 1982

[54] GRAIN DELIVERY ATTACHMENT FOR TAILGATE

[76] Inventors: Willard Koch, P.O. Box 252; Melvin R. Koch, P.O. Box 472, both of Three Hills, Alberta, Canada, T0M 2A0

[21] Appl. No.: 153,568

[22] Filed: May 27, 1980

[30] Foreign Application Priority Data

Aug. 2, 1979 [CA] Canada .................................. 333082

[51] Int. Cl.³ ............................................ B65D 47/00
[52] U.S. Cl. .................................. 222/502; 222/523; 222/530
[58] Field of Search ............... 222/502, 505, 523, 530, 222/561, 610, 527, 503; 291/45; 193/5, 6

[56] References Cited

U.S. PATENT DOCUMENTS

| | | | |
|---|---|---|---|
| 612,445 | 10/1898 | Trueblood | 193/5 |
| 1,229,085 | 6/1917 | Insko | 222/502 |
| 2,670,108 | 2/1954 | Skogstad et al. | 222/561 |
| 3,083,057 | 3/1963 | Kiser et al. | 193/5 X |
| 3,675,752 | 7/1972 | Quigley et al. | 193/5 |

FOREIGN PATENT DOCUMENTS 468902 7/1937 United Kingdom ................ 222/523

*Primary Examiner*—David A. Scherbel
*Attorney, Agent, or Firm*—William R. Hinds; George H. Dunsmuir

[57] ABSTRACT

A grain delivery mechanism for use on the rear wall of a dump truck includes a first gate slidably mounted on the rear wall for closing the large opening through which rapid discharge or dumping of the grain occurs, a lever system for raising and lowering the first gate, i.e. moving the first gate between the closed and open positions, a smaller opening in the first gate aligned with a portion of the large opening when the first gate is closed, a second gate slidably mounted on the first gate for opening and closing the smaller opening, and a chute defined by a plate with a discharge opening therein and telescopically extensible pipe sections slidably mounted on the first gate in front of the second gate, so that opening of the second gate when the first gate is closed permits controlled directional discharge of the grain through the smaller opening and chute.

4 Claims, 5 Drawing Figures

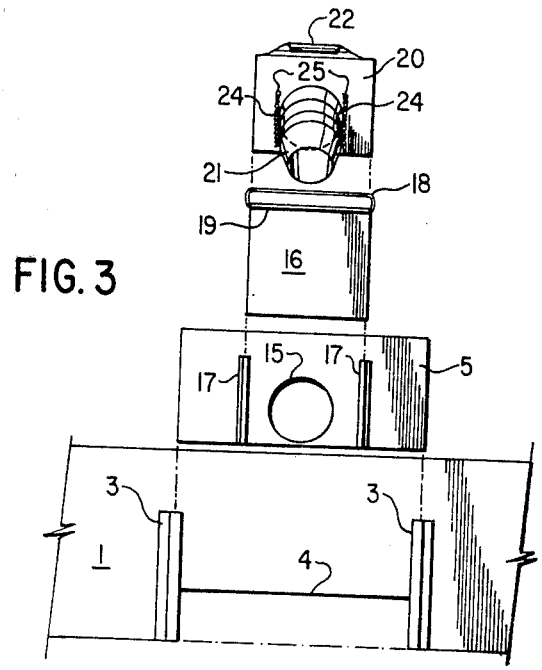
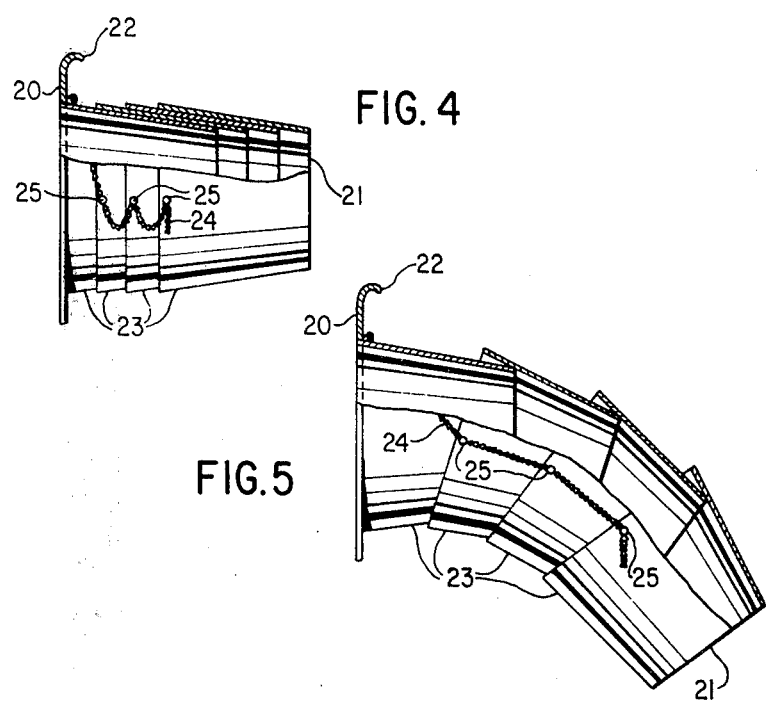

GRAIN DELIVERY ATTACHMENT FOR TAILGATE

BACKGROUND OF THE INVENTION

This invention relates to a grain delivery mechanism, and in particular to a grain delivery mechanism for use on the rear wall of a dump truck.

The art is replete with patents relating to grain delivery chutes or discharge devices. For example, U.S. Pat. Nos. 1,364,581, issued to J. N. Ramsey on Jan. 4, 1921; 2,439,961, issued to R. Bauders on Apr. 20, 1948; 3,083,057, issued to O. R. Kiser et al on Mar. 26, 1963; 3,090,527, issued to J. T. Rensch on May 21, 1963; and 3,675,752, issued to N. R. Quigley et al on July 11, 1972, all disclose discharge chutes and/or end gates for grain carrying vehicles.

Some of the patents listed above are directed to grain discharge devices with limited directional control and rapid dumping, while others of the patents are directed to controlled directional discharge of the grain. The mechanism of the present invention combines both features of the prior art, namely rapid dumping and controlled, directional discharge.

Thus, the object of the present invention is to provide a relatively simple, yet effective, grain delivery mechanism for use on the rear wall of a dump truck.

SUMMARY OF THE INVENTION

Accordingly, the present invention relates to a grain delivery mechanism for use on a wall of a dump truck or other vehicle of the type which includes a large discharge opening through which grain can be dumped rapidly from the vehicle, said mechanism comprising first gate means movably mounted on said vehicle wall for movement between a closed position covering said large discharge opening and an open position; a smaller discharge opening in said first gate means aligned with a portion of said large discharge opening when the first gate means is in the closed position; second gate means movably mounted on said first gate means for movement between a closed position covering said smaller discharge opening and an open position; and chute means movably mounted on said first gate means in front of said second gate means for directionally discharging grain from the vehicle when the first gate means is in the closed position and said second gate means is in the open position.

BRIEF DESCRIPTION OF THE DRAWINGS

The invention will now be described in greater detail with reference to the accompanying drawings which illustrate a preferred embodiment of the invention, and wherein:

FIG. 3 is an exploded elevation view of the mechanism of FIGS. 1 and 2 with parts omitted;

FIG. 4 is a partly sectioned elevation view of a delivery chute for controlled grain delivery in the retracted position; and FIG. 5 is a partly sectioned view of the chute of FIG. 4 in the extended position.

DESCRIPTION OF THE PREFERRED EMBODIMENT(S)

Figure 1:
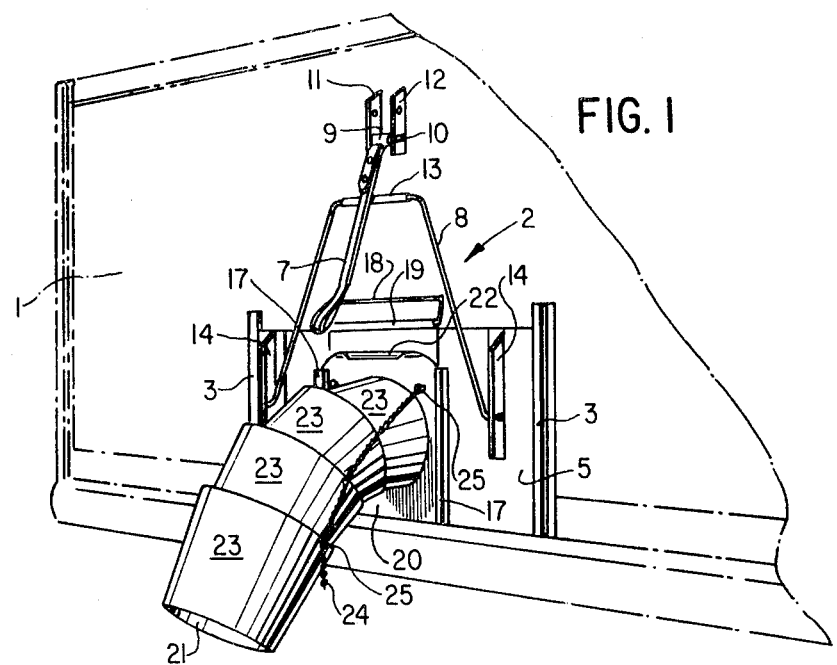
FIG. 1 is a perspective view of a grain delivery mechanism in accordance with the present invention in closed position on the rear end of a truck.
Figure 2:
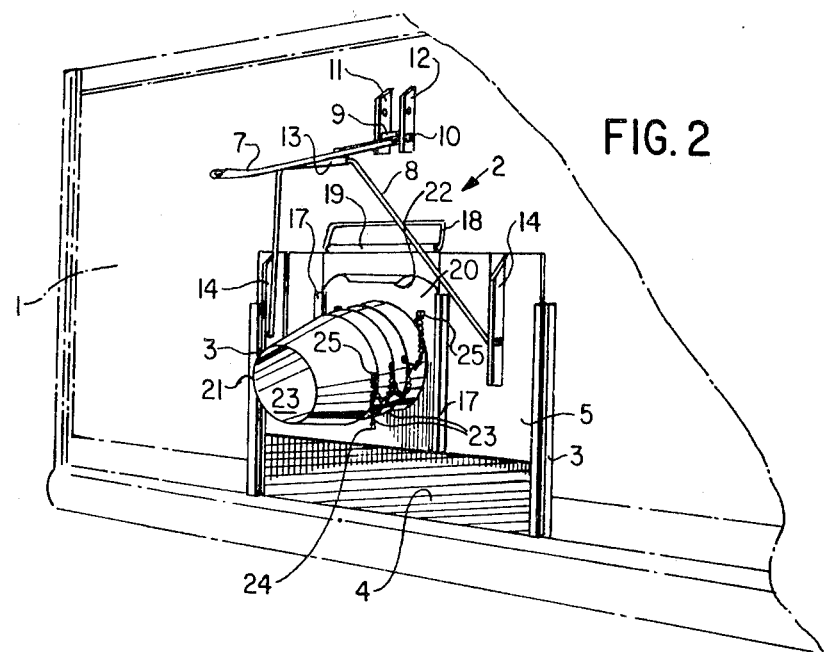
FIG. 2 is a perspective view of the mechanism of FIG. 1 in an open dumping position.

Referring to the drawings, a grain delivery mechanism in accordance with the present invention is intended for use on a rear wall 1 of a dump truck or the like. The mechanism generally indicated at 2 includes a pair of tracks 3, which are mounted on each side of a main opening 4 at the bottom center of the rear wall 1 of the truck. The tracks 3 slidably support a gate 5 for closing the opening 4. The gate 5, merely a rectangular plate, is slidable between the closed and open positions (FIGS. 1 and 2 respectively). The bottom of the opening and the stop for the gate 5 is defined by the usual ledge 6 at the bottom of the rear wall 1 of the truck.

The gate 5 is opened and closed manually by a lever system, which includes a handle 7 and a generally inverted U-shaped linkage 8. The inner end of the handle 7 is defined by a sleeve 9. A pin 10 extends through the sleeve 9 and through both sides of a clevis or bracket defined by a pair of plates 11 and 12 mounted on the rear wall 1 above the opening 4. Thus, the handle 7 is pivotally mounted on such rear wall 1 for rotation around a horizontal axis defined by the pin 10. A sleeve 13 on the bight of the linkage 8 is connected to the handle 7 intermediate its ends. Each end of the linkage 8 is pivotally mounted in a plate or bracket 14 extending outwardly from the gate 5 adjacent the side edges thereof.

It is readily apparent that lifting of the handle 7 results in corresponding upward movement of the linkage 8 and of the gate 5, and vice versa. Thus, the gate 5 can readily be opened for rapid discharge of grain via the opening 4, i.e. when dumping.

More controlled, directional discharge of the grain from the truck is effected via a circular opening 15 (FIG. 3) on the bottom center of the gate 5. It will be noted that the opening 15 is aligned with the center of the main opening 4 when the gate 5 is in the closed position. The opening 15 is normally closed by a gate 16 which is slidably mounted in tracks 17 provided on the gate 5 on each side of the opening 15. The tracks 17, like the tracks 3, are merely lengths of metal angle iron having a generally Z-shaped cross-section; the vertical arm of the Z being perpendicular to the top and bottom arms thereof. The gate 16 is provided with a handle 18 at its top end for manually raising and lowering the door. The handle 18 is merely a rod pivotally mounted in a sleeve 19 on the top end of the gate 16.

A plate 20 carrying a chute 21 is also slidably mounted in the tracks 17 in front of the gate 16. A handle 22 on and integral with the top end of the plate 20 permits raising or lowering of the chute 21. The chute 21 can be left in place during transporting of the grain, or removed using the handle 22 and reinserted upon reaching a dumping site. The chute 21, which is used for controlled, directional discharge of grain from the truck, is defined by a plurality of identical hollow, frusto-conical pipe sections 23. The sections 23 telescope together to a retracted position (FIG. 4) for transportation or can be pulled apart to an extended position (FIG. 5). The innermost pipe section 23 is permanently attached to the sides of a circular opening in the plate 20. The pipe sections 23 are connected to each other and to the plate 20 by chains 24 which extends between lugs 25 on the plate 20 and the pipe sections 23 on each side thereof. In the fully extended position of the chute 21, the chain 24 is fully extended or taut.

In use, if rapid dumping of the contents of the truck is desired, the handle 7 is raised to open the gate 5. On the other hand, if controlled, directional discharge of the contents of the truck is desired, for example, into the inlet end of a grain feed auger or into storage facilities below the level of the truck, the chute 21 is extended (FIGS. 1 and 5) and the gate 16 is raised. Upon completion of a grain unloading operation, the chute 21 is retracted and is locked in the retracted position, i.e. by jamming the pipe sections 23 together, by a hook and eye arrangement (not shown) or by hooking the outer free end of the chain 24 around a hook (not shown) on the plate 20. The chute 21 can be removed and stored in the truck or left in place during movement of the truck. Moreover, before dumping the chute 21 can either be removed (if it was not removed following the last directional grain unloading operation) or locked in the retracted position (FIGS. 1 and 4).

Of course, the rate of dumping of grain through the opening 4 can be controlled by the gate 5, and the rate of directional discharge of grain through the opening 15 and chute 21 can be controlled or varied by the degree of opening of the gate 16.

Further modifications and alternative embodiments of the invention will be apparent to those skilled in the art in view of the foregoing description. Accordingly, this description is to be construed as illustrative only and is for the purpose of teaching those skilled in the art, the manner of carrying out the invention. It is further understood that the form of the invention herewith shown and described is to be taken as the presently preferred embodiment. Various changes may be made in the shape, size and general arrangement of components, for example, equivalent elements may be substituted for those illustrated and described herein, parts may be used independently of the use of other features, all as will be apparent to one skilled in the art after having the benefits of the description of the invention.

What I claim is:

1. A dual mode, grain delivery mechanism for use on a wall of a dump truck or other vehicle of the type which includes a large discharge opening through which grain can be dumped rapidly from the vehicle in a first mode, said mechanism comprising first gate means slidably mounted on said vehicle wall for ready sliding movement back and forth between a closed position covering said large discharge opening and an open position for rapid grain delivery; a smaller discharge opening in said first gate means aligned with a portion of said large discharge opening when the first gate means is in the closed position; second gate means slidably mounted on said first gate means for ready sliding movement back and forth between a closed position covering said smaller discharge opening and an open position for slower grain delivery in a second mode; and chute means movably mounted on said first gate means in front of said second gate means for directionally discharging grain from the vehicle when the first gate means is in the closed position and said second gate means is in the open position.

2. A grain delivery mechanism according to claim 1, including first track means on the wall of the vehicle for slidably receiving said first gate means; and second track means on said first gate means for slidably supporting said second gate means.

3. A grain delivery mechanism according to claim 2, wherein said chute means includes plate means slidably removably mounted in said second track means in front of said second gate means but independently of said second gate means; and a plurality of telescopically interconnected pipe sections mounted on said plate means, said pipe sections being movable between retracted and extended positions.

4. A grain delivery mechanism according to claim 1, 2, or 3, including a lever system for manually opening said first gate means, said lever system comprising a handle pivotally mounted on said vehicle wall above said large discharge opening, and a linkage interconnecting said handle and said first gate means, whereby movement of said handle in one direction results in corresponding movement of said first gate means.

* * * * *